(No Model.) 2 Sheets—Sheet 1.

J. BÜTTEL.
PROCESS OF MAKING ULTRAMARINE BLUE.

No. 484,388. Patented Oct. 18, 1892.

Witnesses
Oscar A. Michel
John A. Westerveld

Inventor
Johann Büttel,
By Drake & Co., Atty's.

THE NORRIS PETERS CO., PHOTO-LITHO., WASHINGTON, D. C.

(No Model.) 2 Sheets—Sheet 2.
J. BÜTTEL.
PROCESS OF MAKING ULTRAMARINE BLUE.

No. 484,388. Patented Oct. 18, 1892.

Witnesses
Oscar A. Michel
John Westwick

Inventor
Johann Büttel,
By Drake & Co, Atty's.

UNITED STATES PATENT OFFICE.

JOHANN BÜTTEL, OF NEWARK, NEW JERSEY.

PROCESS OF MAKING ULTRAMARINE-BLUE.

SPECIFICATION forming part of Letters Patent No. 484,388, dated October 18, 1892.

Application filed November 19, 1891. Serial No. 412,374. (No specimens.)

*To all whom it may concern:*

Be it known that I, JOHANN BÜTTEL, a citizen of Germany, residing at Newark, in the county of Essex and State of New Jersey, have invented certain new and useful Improvements in Processes of Making Ultramarine-Blue; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The manufacture of ultramarine-blue by the apparatus and processes heretofore employed is attended by a great waste and loss of material and by the production of a more or less unsatisfactory article.

The object of this invention is to facilitate the manufacture of ultramarine-blue, to avoid loss by waste, and to secure other advantageous results.

To this end the invention consists in the improved process, as herein set forth, and finally pointed out in the claim.

Figure 1:
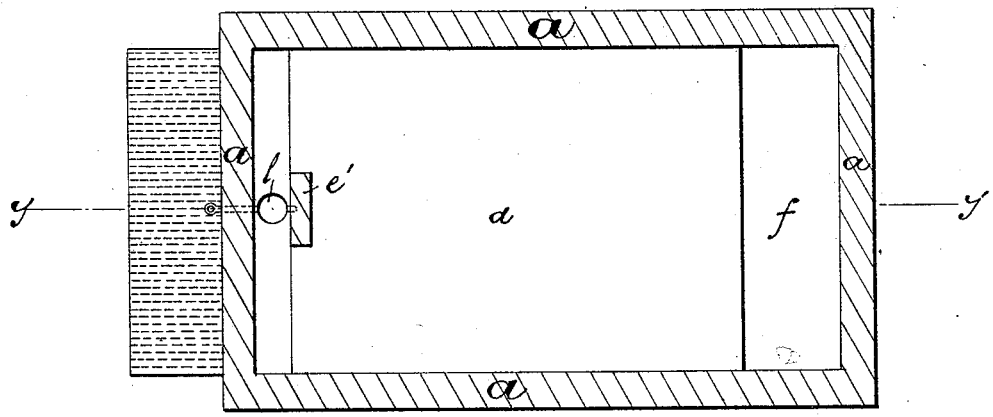
Figure 2:
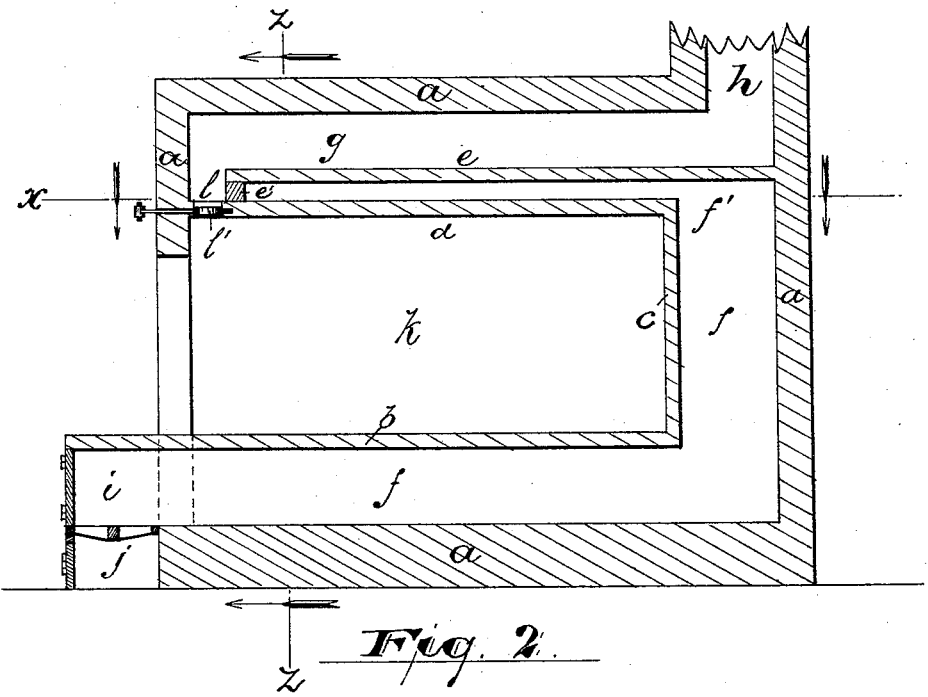
Figure 3:
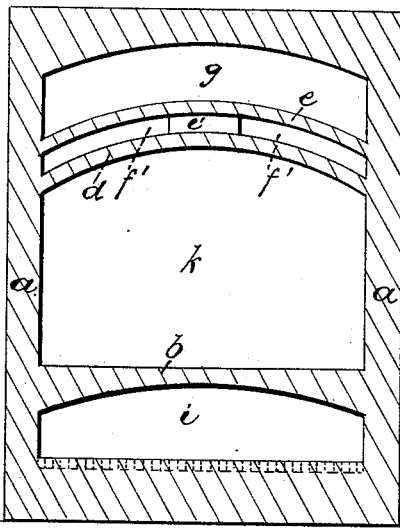

Referring to the accompanying drawings, in which similar letters of reference indicate corresponding parts in each of the several figures, Figure 1 represents a horizontal transverse section of an oven which I employ for baking the materials used in the manufacture of ultramarine-blue, taken through the line $x$ of Fig. 2. Fig. 2 is a central vertical longitudinal section of said oven, taken through the line $y$ of Fig. 1; and Fig. 3 is a vertical transverse section taken through the line $z$ of said Fig. 2.

In said drawings, $a$ indicates the outer walls of said oven; $b$, the hearth; $c$, the inner back wall of the oven; $d$ and $e$, the crown-walls; $f$, $f'$, and $g$, the flues for carrying off the products of combustion and the gases, and $h$ the chimney. $i$ is the fire-chamber, and $j$ the ash-chamber.

The heat and products of combustion pass beneath and above the baking-chamber $k$ through the flues $f$, $f'$, and $g$ into the chimney $h$, and the gases from the material being baked pass through an aperture $l$, Figs. 1 and 2, into the flue $g$, said opening $l$ being supplied with a damper $l'$ to open and close said aperture when desired.

The ingredients and proportions I usually employ are as follows: rosin, one hundred pounds; sulphur, eight hundred pounds; gravel, one hundred and eighty to one hundred and ninety pounds; clay, six hundred pounds, and soda six hundred and twenty-five pounds.

In proceeding to make ultramarine-blue I first mix and grind the ingredients to a powder in the usual manner. I then place the compound in the baking-chamber of the oven and subject it to a temperature of from 1,500° to 1,800° Fahrenheit for four or five days. I then draw the fire, close up the oven, and let the compound remain therein for about twenty days. I then remove and place the compound into a tank or tanks of running water, letting it remain therein for about three days, or until all foreign substances are washed out. The water is then drained off and the compound, in a wet or semi-liquid condition, is placed in a mill of any suitable construction and reground for five or six hours, or until it is sufficiently pulverized, water being added, as required, from time to time during the grinding process. The compound is then removed and refined in the ordinary manner, after which it is dried, and is then ready for packing and shipping.

Having thus described my invention, what I claim as new, and desire to secure by Letters Patent of the United States, is—

In the manufacture of ultramarine-blue, the process herein described of treating the compound after the materials of which it is composed have been primarily mixed and ground, which consists in placing the compound in bulk in an oven and subjecting it for five or six days to a temperature of from 1,500° to 1,800° Fahrenheit, then drawing the fire and closing the oven and allowing the compound to remain therein for about twenty days, then removing, washing, and regrinding it while in a semi-liquid condition until it is sufficiently pulverized, then removing it from the mill, and drying and refining it in the ordinary manner, as set forth.

In testimony that I claim the foregoing I have hereunto set my hand this 14th day of November, 1891.

JOHANN BÜTTEL.

Witnesses:
OSCAR A. MICHEL,
OLIVER DRAKE.